United States Patent
Walstad et al.

(10) Patent No.: US 12,096,761 B2
(45) Date of Patent: Sep. 24, 2024

(54) ANIMAL TRAP FOR KILLING AN ANIMAL, METHOD FOR PREVENTING UNWANTED ELECTRICAL SHOCKS BY AN ANIMAL TRAP AND USING A SHIELD IN AN ELECTRIC ANIMAL TRAP

(71) Applicant: SWISSINNO SOLUTIONS AG, St. Gallen (CH)

(72) Inventors: Dennis Walstad, Elburn, IL (US); Daniel Zuzuly, Geneva, IL (US)

(73) Assignee: SWISSINNO SOLUTIONS AG, St. Gallen (CH)

( * ) Notice: Subject to any disclaimer, the term of this patent is extended or adjusted under 35 U.S.C. 154(b) by 223 days.

(21) Appl. No.: 17/598,050

(22) PCT Filed: Mar. 25, 2019

(86) PCT No.: PCT/EP2019/057437
§ 371 (c)(1),
(2) Date: Sep. 24, 2021

(87) PCT Pub. No.: WO2020/192884
PCT Pub. Date: Oct. 1, 2020

(65) Prior Publication Data
US 2022/0159940 A1  May 26, 2022

(51) Int. Cl.
*A01M 23/38* (2006.01)
(52) U.S. Cl.
CPC .................. *A01M 23/38* (2013.01)
(58) Field of Classification Search
CPC .................................... A01M 23/38
USPC ....................................... 43/98, 99
See application file for complete search history.

(56) References Cited

U.S. PATENT DOCUMENTS

| | | | | |
|---|---|---|---|---|
| 1,038,902 A | * | 9/1912 | Kruczynski | A01M 23/38 43/99 |
| 1,048,995 A | * | 12/1912 | Marawiecki | A01M 23/38 43/99 |
| 1,074,770 A | * | 10/1913 | Beardsley | A01M 23/38 43/99 |

(Continued)

FOREIGN PATENT DOCUMENTS

| | | | |
|---|---|---|---|
| AU | 4274396 A | * | 1/1997 |
| CN | 102349490 A | * | 2/2012 |

(Continued)

OTHER PUBLICATIONS

International Search Report for PCT/EP2019/057437, prepared by the European Patent Office, mailing date Nov. 11, 2019, 4 pages.

*Primary Examiner* — Darren W Ark
(74) *Attorney, Agent, or Firm* — Brooks Kushman P.C.

(57) ABSTRACT

An animal trap for killing an animal having a trap body and an electrical energy source. The electrical energy source is connected to a high voltage circuit. At least a first and a second, preferably a third, killing plate, wherein the first killing plate is connected to the high voltage circuit and the second killing plate is connected to the high voltage circuit are present. Preferably the third killing plate is connected to the first killing plate, such that in case an animal steps on the first and the second killing plate simultaneously the electric high voltage circuit is closed, and the animal is electrocuted. A shield, in particular a conductive shield, is arranged between the second killing plate and the trap body.

12 Claims, 8 Drawing Sheets

(56) References Cited

U.S. PATENT DOCUMENTS

Figure 1:
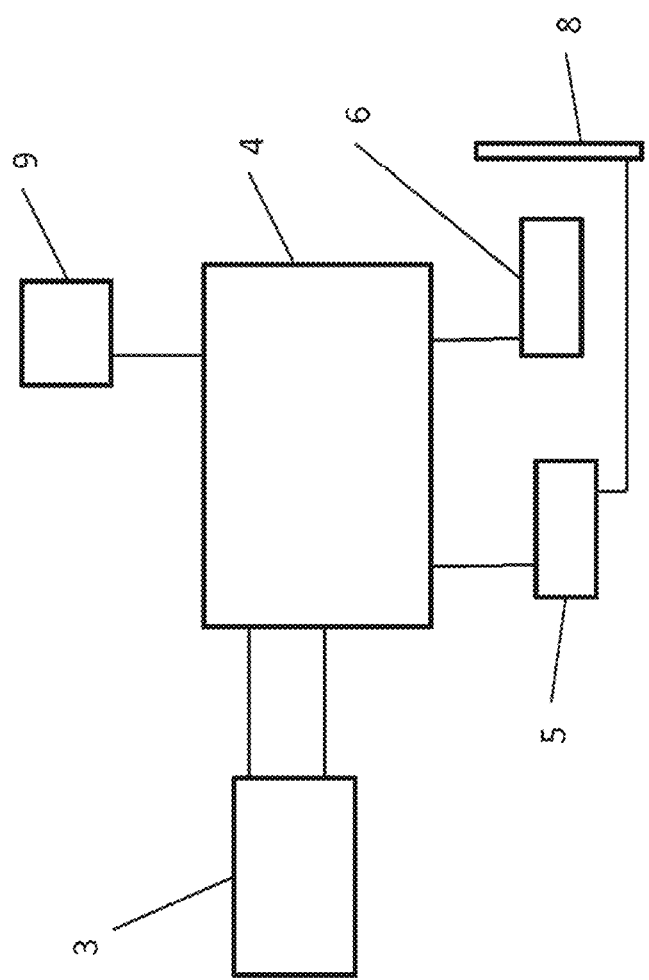

| | | | | | |
|---|---|---|---|---|---|
| 1,084,071 | A | * | 1/1914 | Darling | A01M 23/38 43/99 |
| 1,112,228 | A | * | 4/1914 | Palmer | A01M 23/38 43/72 |
| 1,805,407 | A | * | 5/1931 | Lagarde | A01M 23/38 43/99 |
| 2,229,300 | A | * | 1/1941 | Montroy | A01M 23/38 43/98 |
| 2,465,686 | A | * | 3/1949 | Hohler | A01M 23/38 43/99 |
| 4,205,480 | A | * | 6/1980 | Gartner | A01M 23/38 43/98 |
| 4,250,655 | A | * | 2/1981 | Munns | A01M 23/38 43/99 |
| 4,949,500 | A | * | 8/1990 | Jefferys | A01M 1/223 43/112 |
| 5,269,091 | A | * | 12/1993 | Johnson | A01M 23/38 43/112 |
| 5,953,853 | A | * | 9/1999 | Kim | A01M 23/38 43/61 |
| 6,735,899 | B1 | * | 5/2004 | Anderson | A01M 23/04 43/98 |
| 7,219,466 | B2 | * | 5/2007 | Rich | A01M 23/38 43/98 |
| 7,249,436 | B2 | * | 7/2007 | Ravenelle | H05C 1/00 336/200 |
| 2003/0131522 | A1 | * | 7/2003 | Swift | A01M 23/38 43/98 |
| 2004/0231227 | A1 | * | 11/2004 | Rich | A01M 19/00 43/98 |
| 2008/0216387 | A1 | * | 9/2008 | Peters | A01M 23/38 43/98 |
| 2009/0102600 | A1 | * | 4/2009 | Noe | A01M 31/002 340/3.1 |
| 2010/0236132 | A1 | * | 9/2010 | Rivera | A01M 23/38 43/98 |
| 2012/0285075 | A1 | * | 11/2012 | Lubic | A01M 23/38 43/60 |
| 2014/0013649 | A1 | * | 1/2014 | Rivera | A01M 23/38 43/99 |
| 2018/0139949 | A1 | * | 5/2018 | Liu | A01M 99/00 |
| 2019/0029246 | A1 | * | 1/2019 | Kletzli | A01M 23/16 |
| 2019/0230915 | A1 | * | 8/2019 | Wanninger | H02M 3/155 |
| 2019/0364876 | A1 | * | 12/2019 | Kletzli | A01M 23/08 |
| 2020/0008417 | A1 | * | 1/2020 | Koziar, Jr. | G01V 3/02 |
| 2020/0022356 | A1 | * | 1/2020 | Zhang | A01M 23/16 |
| 2020/0187486 | A1 | * | 6/2020 | Chen | A01M 23/38 |
| 2020/0253187 | A1 | * | 8/2020 | Files | A01M 19/00 |
| 2021/0176980 | A1 | * | 6/2021 | Kauffman | A01M 23/38 |
| 2021/0392871 | A1 | * | 12/2021 | Kaye | A01M 23/16 |
| 2022/0338460 | A1 | * | 10/2022 | Miao | A01M 23/18 |
| 2023/0064810 | A1 | * | 3/2023 | Feng | A01M 23/16 |
| 2023/0066844 | A1 | * | 3/2023 | Chen | A01M 23/38 |
| 2023/0301293 | A1 | * | 9/2023 | Casalanguida | A01M 23/38 43/99 |

FOREIGN PATENT DOCUMENTS

| | | | | | |
|---|---|---|---|---|---|
| CN | 102599142 | A | * | 7/2012 | |
| CN | 204426472 | U | * | 7/2015 | |
| CN | 211510412 | U | * | 9/2020 | A01M 23/38 |
| CN | 216315079 | U | * | 4/2022 | |
| CN | 115633672 | A | * | 1/2023 | |
| EP | 1382243 | A1 | * | 1/2004 | A01M 19/00 |
| EP | 3420816 | A1 | * | 1/2019 | A01M 23/16 |
| GB | 2578312 | A | * | 5/2020 | A01M 23/16 |
| RU | 2751839 | C1 | * | 7/2021 | A01M 19/00 |
| WO | WO-9918780 | A1 | * | 4/1999 | A01M 1/026 |
| WO | WO-2005122756 | A2 | * | 12/2005 | A01M 23/12 |
| WO | WO-2009088966 | A1 | * | 7/2009 | A01M 23/38 |
| WO | WO-2010130262 | A2 | * | 11/2010 | A01M 23/38 |
| WO | WO-2011098087 | A1 | * | 8/2011 | A01M 23/38 |
| WO | WO-2016028219 | A1 | * | 2/2016 | A01M 19/00 |
| WO | WO-2018160831 | A1 | * | 9/2018 | A01M 23/38 |
| WO | WO-2020010078 | A1 | * | 1/2020 | A01M 23/38 |
| WO | WO-2021030650 | A2 | * | 2/2021 | A01M 23/08 |
| WO | WO-2021119507 | A1 | * | 6/2021 | A01M 23/38 |
| WO | WO-2021171319 | A1 | * | 9/2021 | A01M 23/08 |

* cited by examiner

ANIMAL TRAP FOR KILLING AN ANIMAL, METHOD FOR PREVENTING UNWANTED ELECTRICAL SHOCKS BY AN ANIMAL TRAP AND USING A SHIELD IN AN ELECTRIC ANIMAL TRAP

CROSS-REFERENCE TO RELATED APPLICATION

This application is the U.S. national phase of PCT Application No. PCT/EP2019/057437 filed on Mar. 25, 2019, the disclosure of which IS incorporated in it's entirety by reference herein.

The invention is directed to a animal trap for killing a animal, a method for preventing unwanted electrical shocks by a animal trap and the use of a shield in an electronic animal trap according to the preamble of the independent claims.

Electronic animal traps are known in the state of the art. Those traps comprise two electrodes which can be charged with high voltage such that in case a animal touches both electrodes, the trap fires high voltage through the animal's body and thereby kills the animal by electrocution.

For example U.S. Pat. No. 7,219,466 discloses an electronic animal trap having a three killing plate configuration for safely killing the animal inside the trap. The three plate configuration securely traps the animal inside the trap when the high voltage is fired, since the high voltage is only fired when the animal touches the killing plate which is farthest away from the entrance of the trap.

It has been observed that the problem of those kinds of traps is a safety hazard due to the high voltages applied inside the trap. In case a user holds the housing of the trap while the trap fires the high voltage or the user has the hand close to the middle firing plate and the battery, the user might be exposed to a substantial electrical shock. This can be uncomfortable or dangerous for the user.

It is therefore an object of the present invention to obviate the drawbacks of the prior art and in particular provide an animal trap which can be handled safely.

The object is accomplished by a animal trap for killing an animal, a method for preventing unwanted electrical shocks and the use of a shield in an electric animal trap according to the independent claims.

The object is in particular accomplished by a animal trap, in particular a rodent trap, for killing an animal comprising a trap body and an electrical energy source. The electrical energy source is connected to a high voltage circuit. The animal trap comprises at least a first and a second, preferably a third, killing plate, wherein the first killing plate is connected to the high voltage circuit, in particular a return path of the high voltage circuit, and the second killing plate is connected to the high voltage circuit, in particular to an output of the high voltage circuit. Preferably, the third killing plate is connected to the first killing plate. The connection of the first killing plate and the second killing plate is designed such that in case a animal steps on the first and the second killing plate simultaneously, the electric high voltage circuit is activated and the animal is electrocuted. The animal trap further comprises a shield, in particular a conductive shield, which is arranged between a second killing plate and the trap body.

By arranging a shield between the second killing plate and the trap body, a user touching the trap on the outside anywhere near the second killing plate is protected from electric shocks.

Rodents can be mice, rats and similar animals.

The shield is arranged either on the killing plate or on the trap body and is in particular not an integral part of the trap body itself. Preferably, the shield is made from a different material than the trap body.

Preferably, the shield is a conductive shield which is made from a conductive material, such as a metal, conductive paint, conductive foam, conductive plastic or a semimetal.

The connections between an energy source and killing plates and high voltage circuit are preferably incorporated by wire, spring clips, thin metal strips or any other form of electric conductor.

In case of a three killing plate embodiment, the first killing plate and the third killing plate are connected through a trigger isolating network to prevent triggering from happening if only the second killing plate and the third killing plate are contacted by the animal. This obviates any escape of the animal.

The trigger isolating network keeps the high voltage circuit from being initially triggered if the animal touches only the second and third plates simultaneously.

The animal trap can comprise a control unit connected to the high voltage circuit to control the firing of high voltage. The control unit controls the firing of pulses of high voltage. The time and voltage needed depends on the animal, for rodents for example pulses of 5 to 10 thousands peak volts are applied for two or more minutes as soon as the animal triggers the firing of the high voltage.

Such a control unit enables the controlled firing of high voltages in case and only in case a animal is inside the trap and is supposed to be electrocuted.

The control unit can additionally be connected to a switch to switch the animal trap on or off. Furthermore, the control unit preferably controls the voltage or energy levels and the duration of the firing of voltage.

The shield can be grounded to the first killing plate.

This way the electrical field within the device is contained within the killing plate and in the conductive shield and the hand of the user is protected from being exposed to the high voltage because the capacitive coupling between the high voltage plate and the user's hand has been greatly reduced. Thus, the potential between the two connecting points of the user at the trap is reduced from thousands of volt to a level of only a few volts. Thereby, the currents conducted through the body can be reduced to safe and legal levels.

A shield can further be arranged between a trap body, in particular an insulating trap body, and high voltage circuit.

This leads to further enhanced safety.

The shield between the trap body and high voltage circuit can be grounded to the first killing plate.

This way the electrical field within the device is contained within the killing plate and the conductive shield and the hand of the user is protected from being exposed to the high voltage, because the capacitive coupling between the high voltage killing plate and the user's hand has been greatly reduced. Thus, the potential between the two connecting points of the user at the trap is reduced from thousands of volt to a level of only a few volts. Thereby, the currents conducted through the body can be reduced to safe and legal levels.

The shield between a second killing plate and trap body and the shield between high voltage circuit and trap body can be connected to form one common shield.

This way the interior of the trap body is shielded with regard to the electric components. This leads to enhanced safety. Additionally, the trap body can be shielded completely on the inside of the trap body such that there is no possibility for any high voltage to harm a user as long as the user only touches the trap body on the outside.

The trap body can be made from plastic material, in particular plastic material having electrically isolating characteristics. A plastic trap body is easy to produce in high volumes, easily shapeable and electrically isolates the high voltages circuit parts from the outside. The killing plates can be made from electrically conductive material, in particular from metal. For example the killing plates can be made from plated steel. The plates are sized to fill as much space in the body as possible without interfering with the electrical components.

This way the electric shock for killing the animal can be applied optimally.

The trap body can comprise a animal entrance end, wherein preferably the second killing plate is arranged closer to the entrance and than the first killing plate, in particular the third killing plate being arranged closer to the entrance and then the second killing plate.

In this arrangement, an animal can enter the trap almost until the other end opposing the entrance end before the electric voltage is applied. Hence, an escape for the animal is almost impossible.

The trap body can have the shape of an elongated tunnel having a lower tunnel wall below the killing plates and an upper tunnel wall opposite of the lower tunnel wall, wherein the shield can be arranged at least on the inside of the upper and lower tunnel walls.

This allows for an optimal shielding of the high voltage to the outside.

The tunnel itself can basically have any shape such as circular, partly circular, rectangular and/or partly rectangular.

Preferably, the voltage source and the high voltage circuit including the control unit are arranged closer to the upper tunnel wall and are preferably separated from the area of the animal inside the trap by another middle wall.

The shield can additionally be arranged on both side walls of the trap body.

The side walls of the trap body connect the upper tunnel wall and the lower tunnel wall such that a tunnel is created. The arrangement of a shield on those side walls leads to a complete inner shield which enhances safety.

The animal trap can comprise an obstacle which blocks part of the animal entrance end such that a hand cannot be introduced into the trap. This is in particular an option for small animals such as mice since their size is not similar to the size of a human hand.

The obstacle has a size that still enables an animal to enter the trap. Hence, the obstacle is smaller than the cross section of the tunnel. Nevertheless, the obstacle is preferably blocking at least 25%, preferably 50%, more preferably 75% of the entrance cross section of the tunnel.

The object is additionally accomplished by a method for preventing unwanted electrical shocks by an animal trap as previously described comprising the step of shielding the second killing plate of the trap such that the current in a user's body when touching the trap where firing high voltage is reduced.

Such a method enhances safety of the electric animal trap.

The object is further accomplished by the use of a shield in an electric animal trap, in particular a trap as previously described, to prevent electrical shocks of humans when touching the trap from the outside.

Hence, the use of a shield leads to enhance safety.

The size of a typical trap for rats would have an entrance end opening of 6 to 8 cm, preferably rectangular, and an elongation of 18 to 24 cm.

The size of a typical trap for mice would have an entrance end opening of 3 to 4 cm and an elongation of 16 to 20 cm.

The outer dimensions of the trap would obviously be larger since the electric compartment has to be put onto the tunnel.

Figure 4:
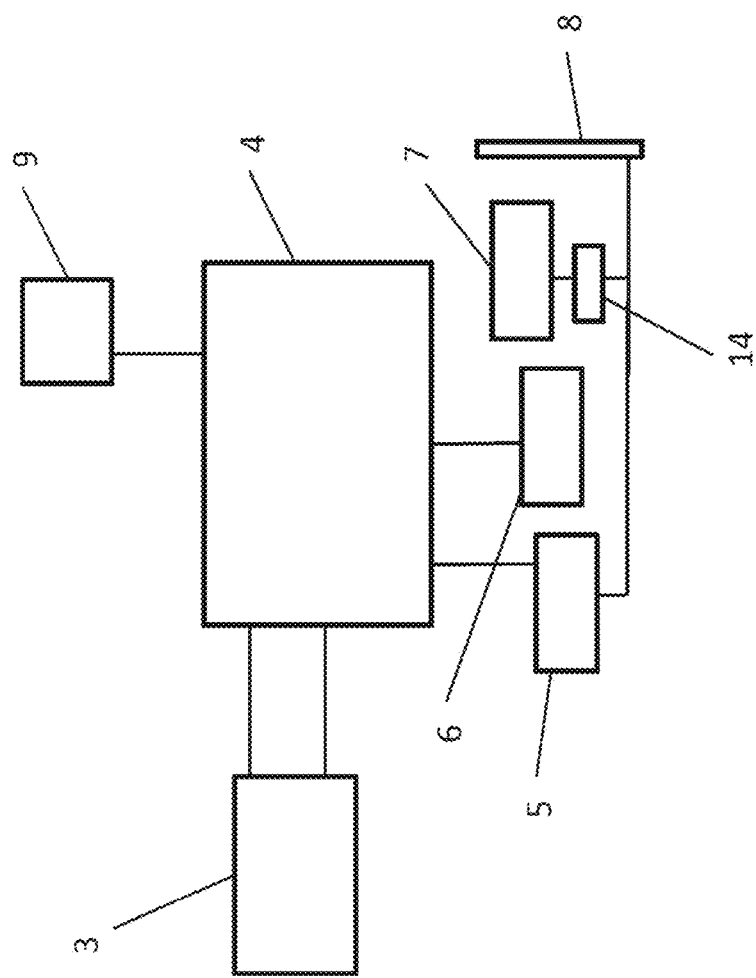
Figure 5:
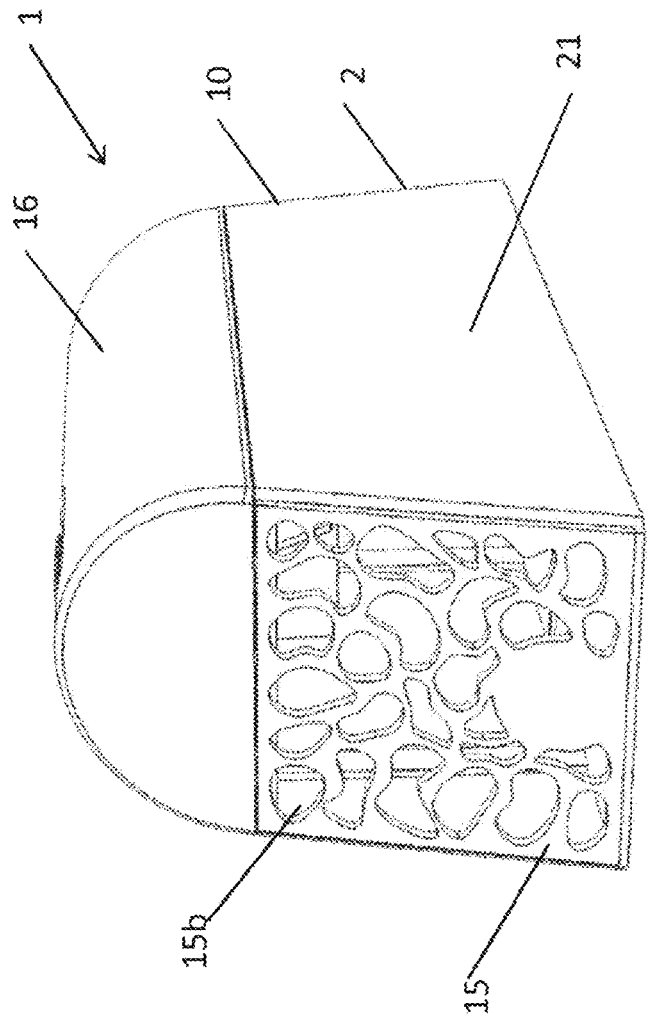
Figure 6:
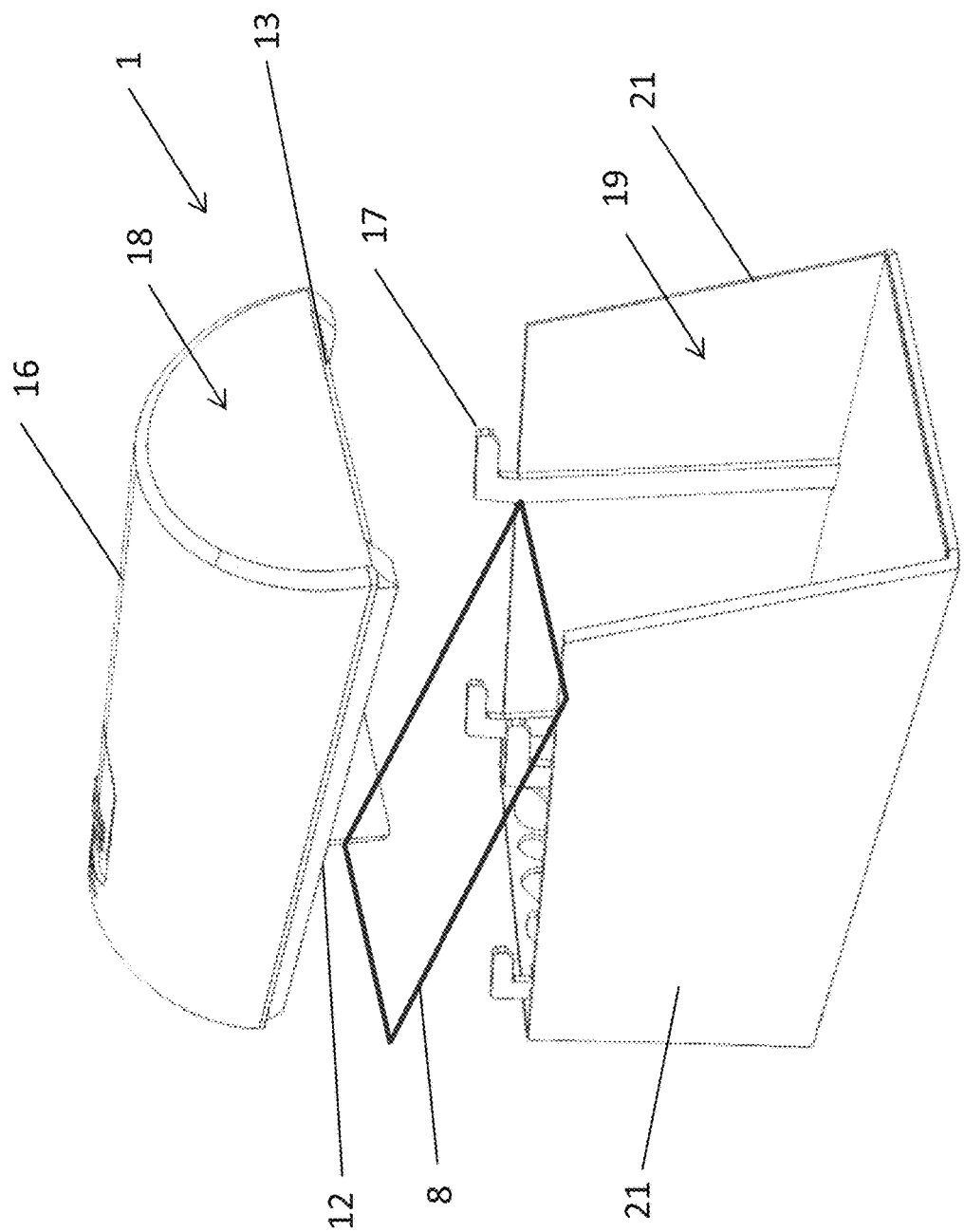
Figure 7:
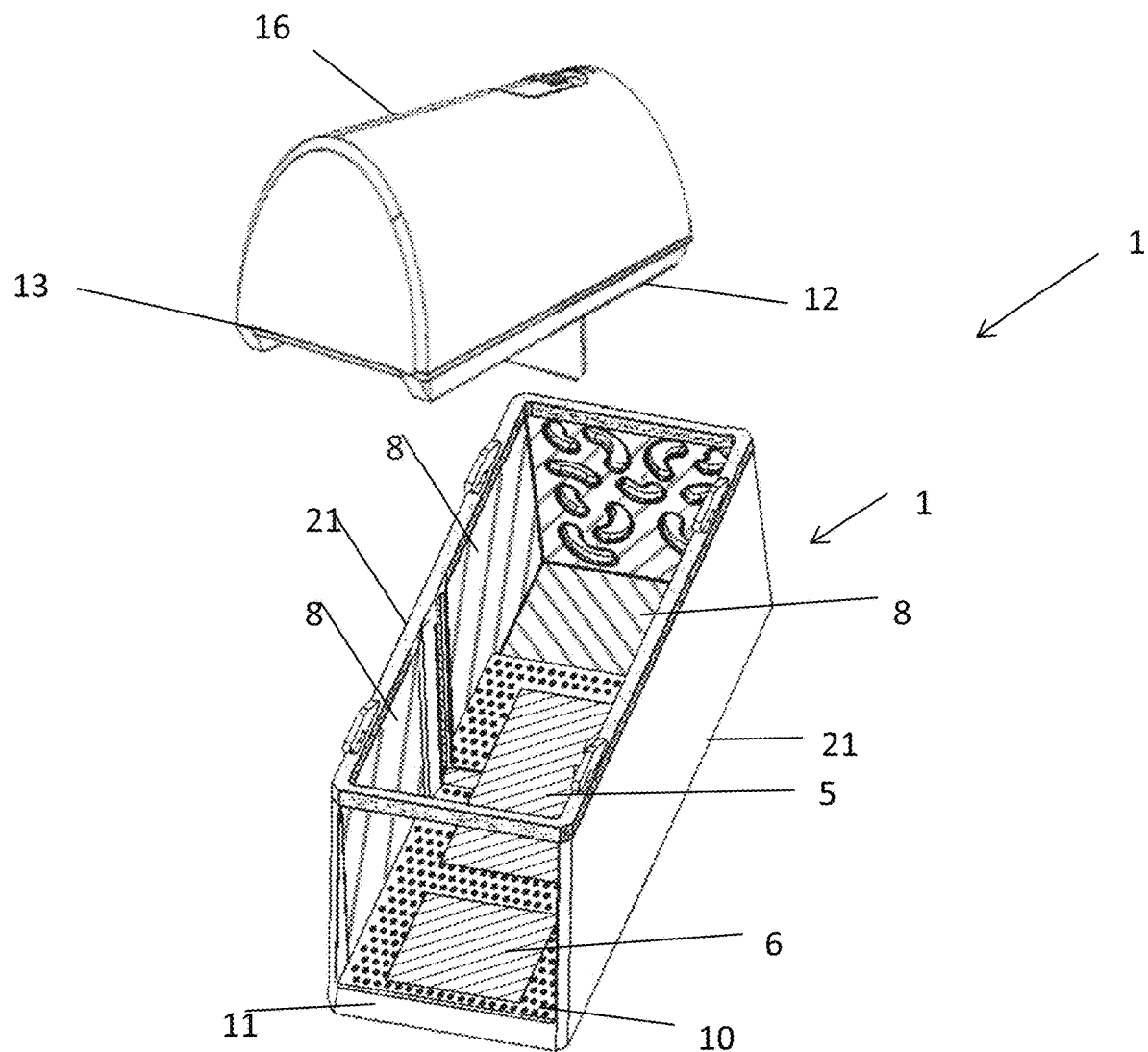
Figure 8:
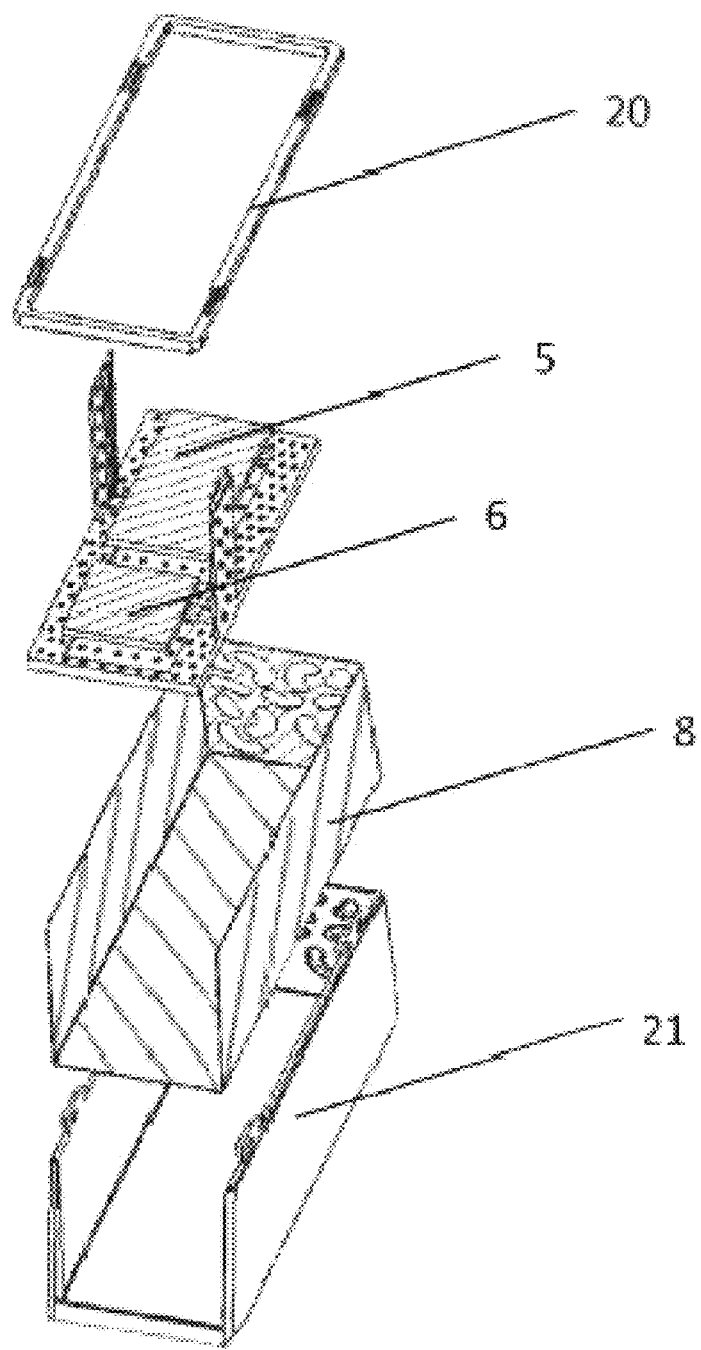

The invention is in the following further described in embodiments by means of figures. Is shows FIG. 1: A schematic electrical overview of the animal trap according to the invention, FIG. 2: a schematic view of the trap in use, FIG. 3: a schematic view of a trap in a second embodiment of the invention;

FIG. 4: a schematic view of the three-plate embodiment of the invention;

FIG. 5: a perspective view of a trap from the back side;

FIG. 6: an exploded view of a trap from the front;

FIG. 7: a perspective view without top part;

FIG. 8: an exploded view of the main parts of the trap.

In FIG. 1 the general schematic is shown regarding the electrical design of the animal trap 1. Since just the general electric layout is shown, there is no trap body 2 shown in FIG. 1. An electrical energy source 3 is connected to a high voltage circuit 4 to provide energy to the high voltage circuit 4. The high voltage circuit 4 is controlled by a control unit 9. The high voltage circuit 4 is connected to a first killing plate 5 and a second killing plate 6. The second killing plate 6 is shielded by a shield 8 which is grounded to the first killing plate 5. The high voltage circuit 4 provides pulses with voltage peaks in the range of five to ten thousand volts. The control unit 9 controls the high voltage circuit 4 and in case the animal connects a first killing plate 5 and a second killing plate 6, the high voltage circuit 4 delivers a high voltage over a time frame of two or more minutes.

Additionally, the trap circuit may comprise indicators for indicating if the trap is armed or if the energy level in the energy source 3 is low. Furthermore, there may be an indicator in case an animal has been electrocuted by the trap. For example a light indicator can be coupled to control unit 9.

To empty the trap after electrocuting an animal, the user can tip the trap on one end and pour the dead animal out.

The trap can typically be rearmed by switching it off with a switch connected to control unit 9 and then back on again to reset the sensing circuit. The sensing circuit is implemented in the control unit 9 to sense if an animal is simultaneously touching the first and second killing plate. The control unit 9 impresses a small voltage between the first killing plate 5 and the second killing plate 6. When the animal touches both killing plate 5, 6 at the same time, a small current is conducted through its body which is sensed by the control unit 9. Typical sensing impedances for this action would be between 1 and 10 Megaohms.

The animal trap 1 can additionally comprise a status indicator for the status of the energy source 3.

The circuit can also be connected to a switch for connecting and disconnecting either the high voltage circuit 4 or the energy source 3 to the high voltage circuit 4 such that a user can safely arm or disarm the trap 1.

Figure 2:
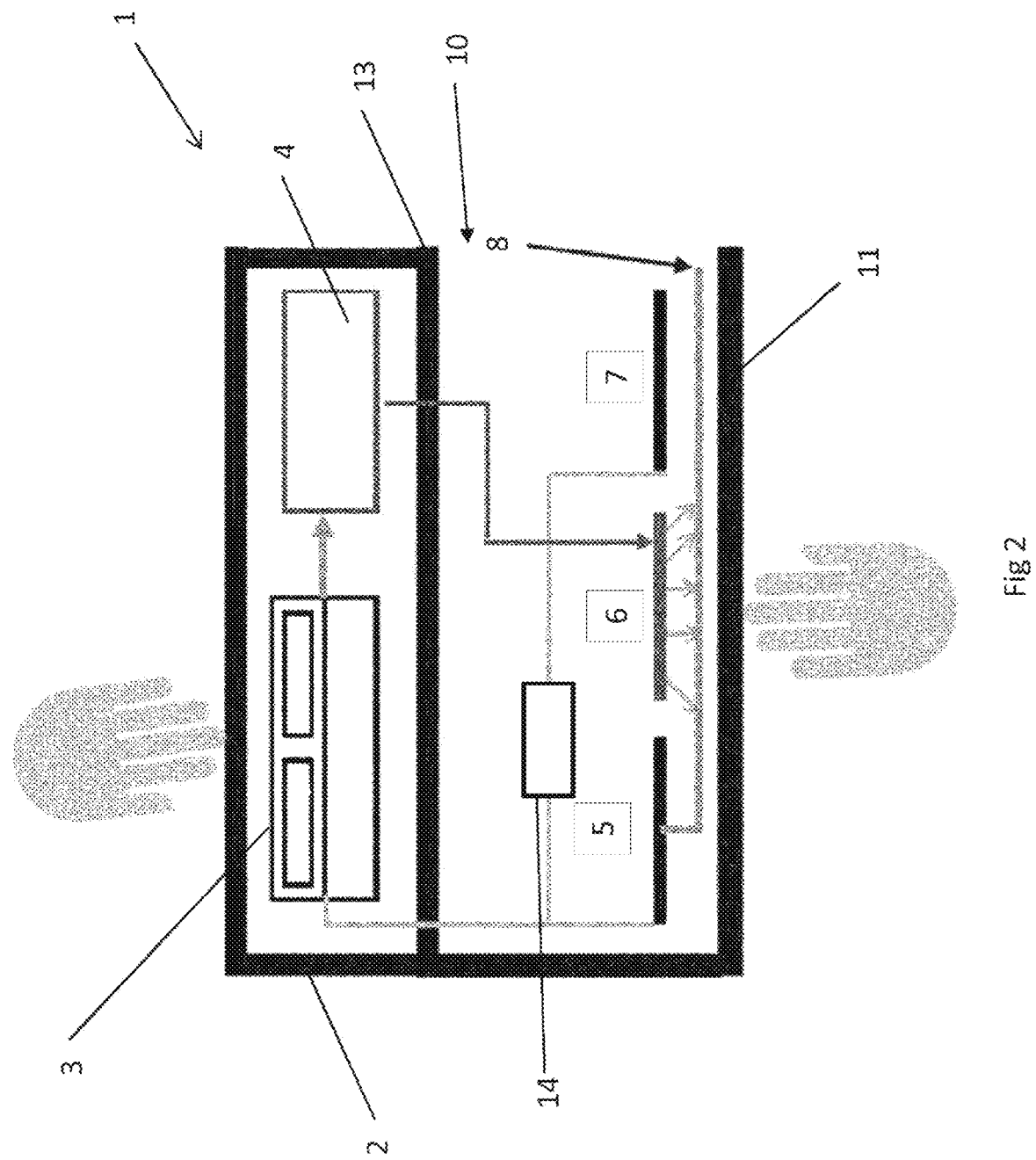

FIG. 2 shows a schematic view of the animal trap 1 comprising a trap body 2. The trap body 2 comprises an energy source 3 and a high voltage circuit 4 which are connected as shown in FIG. 1. The first killing plate 5 is additionally connected to a third killing plate 7 via a trigger isolating network 14. The trigger isolating network isolates the third killing plate 7 from the first killing plate 5 until an animal simultaneously touches the first killing plate 5 and the second killing plate 6. The shield 8 is arranged between the second killing plate 6 and the lower tunnel wall 11 of the trap body 2. The shield 8 is grounded to the first killing plate 5. The killing plates 5, 6, 7 are arranged adjacent to each other such that an animal cannot step in between the killing plates 5, 6, 7 and thereby accidentally not be electrocuted. The trap body 2 further comprises a middle wall 13 by means of which the trap body is separated in two compartments, one for the electrical part and one for the killing plates and for accommodating the animal. The trap body 2 comprises an entrance end 10 through which the animal enters the trap. Additionally, schematically two hands are shown which pick up the trap body 2 and might connect the high voltage circuit without the shield 8.

Figure 3:
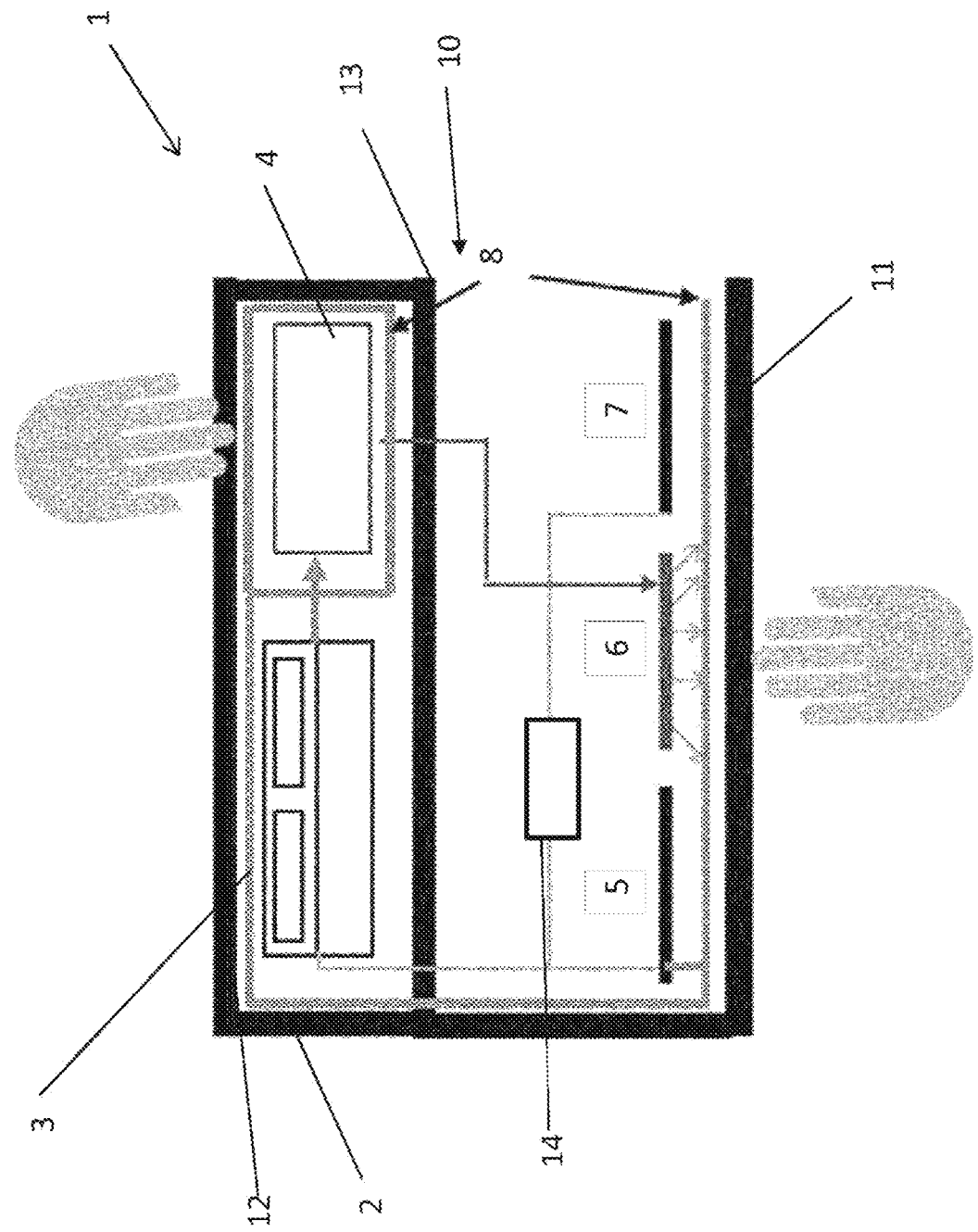

FIG. 3 corresponds to the embodiment of FIG. 2. The only difference is the shield 8 being extended around the inside of trap body 2 such that both hands are shielded. The shield is arranged in a wall of the trap body 2 along the lower tunnel wall 11 and the upper tunnel wall 12. Furthermore, the shield is connected between the upper and lower tunnel walls. All other features correspond to the embodiment of FIG. 2.

In FIG. 4 the general schematic is shown regarding the electrical design of the animal trap 1. Since just the general electric layout is shown, there is no trap body 2 shown in FIG. 4. An electrical energy source 3 is connected to a high voltage circuit 4 to provide energy to the high voltage circuit 4. The high voltage circuit 4 is controlled by a control unit 9. The high voltage circuit 4 is connected to a first killing plate 5 and a second killing plate 6. The first killing plate 5 is additionally connected to a third killing plate 7 via a trigger isolating network 14. The second killing plate 6 is shielded by a shield 8 which is grounded to the first killing plate 5. The high voltage circuit 4 provides pulses with voltage peaks in the range of five to ten thousand volts. The control unit 9 controls the high voltage circuit 4 and in case the animal connects a first killing plate 5 and a second killing plate 6, the high voltage circuit 4 delivers a high voltage over a time frame of two or more minutes All other features of the embodiment shown in FIG. 4 correspond to the embodiment shown and described regarding FIG. 1

FIG. 5 shows a perspective of a trap 1 according to the invention. The trap 1 comprises trap body 2. The trap body comprises an entrance end 10 and side walls 21. Back end 15 comprises openings 15b. When an animal enters the trap 1 the openings 15b make the trap appear having an open end. Hence, the animal is less hesitant to enter the trap 1. The trap 1 further comprises cover 16. The cover 16 encompasses the electrical compartment 18 (see FIG. 6).

FIG. 6 shows an exploded view of a trap 1. The cover 16 is detachably connected to the side walls 21 by connection means 17. The inner wall of the cover 16 is the upper tunnel wall. Additionally, cover 16 comprises middle wall 13 (not visible) which separates the electric compartment 18 from the electrocution compartment 19. On top of the cover a switch is arranged to switch the trap 1 on or off.

FIG. 7 shows a perspective view of a trap 1 without cover 16. The trap 1 comprises lower tunnel wall 11 and side walls 21. The tunnel of the trap is composed from by the walls 11, 21 and back end 15. Inside the tunnel walls the trap 1 comprises shield 8. The trap 1 comprises first and second killing plates 5, 6. As a matter of course a three plate arrangement is similarly possible. The shield 8 protects a user from high voltage when the trap is in use and activated.

FIG. 8 shows an exploded view of the trap 1 according to FIG. 7. The killing plates 5,6 and the shield 8 and connected to the side walls 21 by a frame 20. The killing plates comprise connections to the electric compartment to connect the energy source to the killing plates 5, 6.

The invention claimed is:

1. An animal, in particular a rodent, trap for killing the animal comprising a trap body, an electrical energy source, the electrical energy source being connected to a high voltage circuit, at least a first and a second killing plate, wherein the first killing plate is connected to the high voltage circuit and the second killing plate is connected to the high voltage circuit such that in case the animal steps on the first and second killing plates simultaneously the high voltage circuit is closed and the animal is electrocuted, wherein an electrically conductive shield is grounded to the first killing plate and the shield is arranged between the second killing plate and a lower tunnel wall of the trap body.

2. The animal trap according to claim 1, wherein the trap comprises a control unit connected to the high voltage circuit to control a firing of high voltage by the high voltage circuit.

3. The animal trap according to claim 1, wherein the electrically conductive shield is further arranged between the trap body and the high voltage circuit.

4. The animal trap according to claim 3, wherein the shield arranged between the second killing plate and the trap body and the shield arranged between the high voltage circuit and the trap body are connected to form one common electrically conductive shield.

5. The animal trap according to claim 1 wherein the trap body is made from plastic material, in particular the plastic material having an electrically isolating characteristic.

6. The animal trap according to claim 1 wherein the killing plates are made from electrically conductive material, in particular from metal.

7. The animal trap according to claim 1 wherein the trap body comprises an animal entrance end, wherein the second killing plate is arranged closer to the entrance end than the first killing plate.

8. The animal trap according to claim 7, wherein the shield is additionally arranged on sidewalls of the trap body.

9. The animal trap according to claim 1, wherein the trap body has the shape of an elongated tunnel having the lower tunnel wall below the killing plates and an upper tunnel wall opposite of the lower tunnel wall, wherein the shield is arranged at least on an inside of the lower tunnel wall.

10. The animal trap according to claim 1 wherein the first killing plate and a third killing plate are connected through a network to prevent triggering from happening if only the second killing plate and the third killing plate are contacted by the animal.

11. A method for preventing unwanted electrical shocks comprising:
   providing the animal trap according to claim 1, and
   shielding the second killing plate of the trap via the shield such that the current in a user's body when touching the trap while firing high voltage is reduced.

12. A method for preventing unwanted electrical shocks:
   providing the animal trap according to claim 1, and
   preventing electrical shocks of humans when touching the trap from the outside via the shield.

* * * * *